United States Patent
Inagaki et al.

(10) Patent No.: US 9,039,941 B2
(45) Date of Patent: May 26, 2015

(54) CONDUCTIVE PASTE FOR SCREEN PRINTING

(75) Inventors: Shou Inagaki, Sakura (JP); Hideki Etori, Sakura (JP); Hiroshi Isozumi, Kita-ku (JP); Masanori Kasai, Nerima-ku (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 13/499,122

(22) PCT Filed: Dec. 21, 2010

(86) PCT No.: PCT/JP2010/072949
§ 371 (c)(1),
(2), (4) Date: Jul. 31, 2012

(87) PCT Pub. No.: WO2011/078141
PCT Pub. Date: Jun. 30, 2011

(65) Prior Publication Data
US 2013/0048920 A1    Feb. 28, 2013

(30) Foreign Application Priority Data
Dec. 22, 2009 (JP) .................................. 2009-290511

(51) Int. Cl.
| | | |
|---|---|---|
| *H01B 1/02* | (2006.01) | |
| *H01B 1/22* | (2006.01) | |
| *B22F 1/00* | (2006.01) | |
| *B22F 1/02* | (2006.01) | |
| *B82Y 30/00* | (2011.01) | |
| *C09D 11/03* | (2014.01) | |
| *C09D 11/037* | (2014.01) | |
| *C09D 11/52* | (2014.01) | |
| *B05D 5/12* | (2006.01) | |

(52) U.S. Cl.
CPC .. *H01B 1/22* (2013.01); *B05D 5/12* (2013.01); *B22F 1/0022* (2013.01); *B22F 1/02* (2013.01); *B82Y 30/00* (2013.01); *C09D 11/03* (2013.01); *C09D 11/037* (2013.01); *C09D 11/52* (2013.01); *H01B 1/02* (2013.01)

(58) Field of Classification Search
CPC ..................................... H01B 1/22; B05D 5/12
USPC ............................................................ 252/512
See application file for complete search history.

(56) References Cited

U.S. PATENT DOCUMENTS

| 5,011,627 A  * | 4/1991  | Lutz et al. ....................... 252/512 |
| 7,081,214 B2 * | 7/2006  | Matsuba et al. ............... 252/512 |
| 2004/0004209 A1 | 1/2004  | Matsuba et al. |
| 2008/0280402 A1* | 11/2008 | Moriwaka ....................... 438/164 |
| 2009/0198009 A1* | 8/2009  | Matsuki et al. ................ 524/440 |

FOREIGN PATENT DOCUMENTS

| JP | 2005-248061 A | 9/2005 |
| JP | 2006-213887 A | 8/2006 |
| JP | 2008-91250 A  | 4/2008 |
| JP | 2009-97074 A  | 5/2009 |
| WO | 02/35554 A1   | 5/2002 |
| WO | 2008-143061 A1| 11/2008 |

OTHER PUBLICATIONS

Japanese Office Action dated Jun. 2, 2011, issued in corresponding Japanese Patent Application No. 2011-514980.
International Search Report of PCT/JP2010/072949, mailing date of Feb. 8, 2011.

* cited by examiner

*Primary Examiner* — Mark Kopec
*Assistant Examiner* — William Young
(74) *Attorney, Agent, or Firm* — Westerman, Hattori, Daniels & Adrian, LLP

(57) ABSTRACT

There is provided a conductive paste for screen printing. The conductive paste includes: metal nanoparticles (Y) having an average particle diameter of 1 to 50 nm and protected with a polymer compound having a branched polyalkyleneimine chain and a polymer chain selected from the group consisting of a polyoxyalkylene chain, a polymer chain composed of a polyvinyl alcohol, a polymer chain composed of a water-soluble poly(meth)acrylic acid, a polyacylalkyleneimine chain having a hydrophilic substituent, and a polymer chain composed of a polyacrylamide; metal particles (Z) having an average particle diameter of 200 to 600 nm; a deprotecting agent (A) for the metal nanoparticles; and an organic solvent (B). An aliphatic monocarboxylic acid having 6 to 10 carbon atoms is used as the deprotecting agent (A) for the metal nanoparticles. A polyalkylene glycol is used as the organic solvent (B).

10 Claims, No Drawings

CONDUCTIVE PASTE FOR SCREEN PRINTING

TECHNICAL FIELD

The present invention relates to a conductive paste for screen printing, capable of being baked at a low temperature of 150° C. or lower and being printed on a plastic substrate that cannot be subjected to printing at high temperatures.

BACKGROUND ART

In recent years, production of circuit wirings of electronic devices has required a technology that realizes high-density packaging (formation of fine circuits) at low costs in order for the electronic devices to fulfill the need of ubiquitous age. An example of such a technology known in the art is to form a conductive fine pattern wiring by screen-printing a silver paste containing nanometer-size silver particles (hereinafter, "nanosilver") followed by baking the applied paste at a low temperature of 150° C. or less.

A printing technique reduces the number of process steps and achieves a high throughput and thereby can offer circuit wirings at low costs. If low-temperature baking at 150° C. or less is possible, a commodity plastic such as polyethylene terephthalate (PET) or polyethylene naphthalate (PEN) that has low heat resistance but costs less, can be easily formed into thin films, and can be easily made flexible can be used as a substrate material instead of conventional expensive polyimides. Furthermore, use of a silver paste containing nanosilver enables high-resolution patterning and contributes to realizing high-density packaging. This is because whereas a conventional silver paste containing micrometer-order silver may clog a fine-pitched screen mesh needed for high-resolution printing, a silver paste containing nanosilver has no such drawback.

Under such a circumstance, various types of conductive pastes for printing have been proposed. Various types of conductive pastes for screen printing that contain metal nanoparticles protected with a polymer compound containing a basic nitrogen atom, a deprotecting agent for the metal nanoparticles, metal particles larger than the metal nanoparticles, and an organic solvent have been known as the conductive paste for screen printing.

For example, PTL 1 discloses a silver paste that contains nanosilver particles having an average particle diameter of 0.1 μm or less and silver particles having an average particle diameter of 1 to 20 μm as a silver component. PTL 2 discloses a silver paste that can be baked at a low temperature and contains nanosilver particles having an average particle diameter of 0.001 to 0.1 μm and silver particles having an average particle diameter of 0.01 to 0.5 μm as a silver component. PTL 3 discloses a silver paste that can be baked at a low temperature and contains nanosilver particles having an average particle diameter of 1 to 100 nm and silver particles having an average particle diameter of 0.1 to 10 μm as a silver component.

However, the silver paste disclosed in PTL 1 must be baked at a temperature of 200° C. or more to obtain a volume resistivity of $10^{-5}$ Ωcm and thus is difficult to print on a plastic substrate having insufficient heat resistance. The silver pastes disclosed in PTL 2 and 3 can be baked at a lower temperature than in the related art and can be printed on a plastic substrate having insufficient heat resistance; however, the volume resistivity after low-temperature baking is somewhat high and is unsatisfactory.

In other words, a conductive paste with which a circuit wiring having a lower volume resistivity can be formed on a plastic substrate having a lower heat resistance by low-temperature baking has not been known.

CITATION LIST

Patent Literature

PTL 1: WO2002/035554
PTL 2: Japanese Unexamined Patent Application Publication No. 2005-248061
PTL 3: Japanese Unexamined Patent Application Publication No. 2008-91250

SUMMARY OF INVENTION

Technical Problem

An object of the present invention is to provide a metal paste that can be subjected to screen-printing using a fine-pitched screen mesh capable of forming a fine circuit pattern and that can form a circuit wiring having a lower resistance by low-temperature baking. This can be done by using metal nanoparticles and metal particles larger in size as a metal component.

Solution to Problem

The inventors of the present invention have conducted extensive studies under the aforementioned circumstances and have found that, in a conductive paste for screen printing including metal nanoparticles (Y) having an average particle diameter of 1 to 50 nm and protected with an organic compound (X) containing a basic nitrogen atom, metal particles (Z) having an average particle diameter of more than 100 nm and 5 μm, a deprotecting agent (A) for the metal nanoparticles, and an organic solvent (B) known in the art, when an aliphatic monocarboxylic acid having 6 to 10 carbon atoms is used as the deprotecting agent (A) for the metal nanoparticles and a polyalkylene glycol is used as the organic solvent (B), the resulting conductive paste for screen printing does not allow commodity plastics to dissolve or swell (low activity), generates less odor and has lower toxicity, does not deteriorate the working environment, can be applied by a screen printing technique, allows the organic solvent to evaporate at a temperature lower than conventionally required, and is capable of forming a circuit wiring that shows a lower resistance by baking at a temperature lower than conventionally required. Thus, the present invention has been made.

In other words, the present invention provides a conductive paste for screen printing including metal nanoparticles (Y) having an average particle diameter of 1 to 50 nm and protected with an organic compound (X) containing a basic nitrogen atom, metal particles (Z) having an average particle diameter of more than 100 nm and 5 μm, a deprotecting agent (A) for the metal nanoparticles, and an organic solvent (B), in which an aliphatic monocarboxylic acid having 6 to 10 carbon atoms is used as the deprotecting agent (A) for the metal nanoparticles and a polyalkylene glycol is used as the organic solvent (B).

Advantageous Effects of Invention

The present invention of the conductive paste for screen printing can be obtained by selecting a most suitable monocarboxylic acid or dicarboxylic anhydride, from among conventional deprotecting agents, that can deprotect the organic compound containing a basic nitrogen atom from the metal nanoparticle surfaces at a lower temperature and selecting an optimum organic solvent, from among conventional organic solvents, that evaporates at a temperature than conventionally required, is suitable for a screen printing technique, and does not damage the plastic substrate. Since the conductive paste is prepared by a combination of such materials, the conductive paste has notable technical effects such as that it does not allow commodity plastics to dissolve or swell (low activity), generates less odor and has lower toxicity, does not deteriorate the working environment, can be applied by a screen printing technique, allows the organic solvent to evaporate at a temperature lower than conventionally required, and is capable of forming a circuit wiring that shows a lower resistance by baking at a temperature lower than conventionally required.

DESCRIPTION OF EMBODIMENTS

The present invention will now be described in detail.

The present invention provides a conductive paste for screen printing, the conductive paste including metal nanoparticles (Y) having an average particle diameter of 1 to 50 nm and protected with an organic compound (X) containing a basic nitrogen atom, metal particles (Z) having an average particle diameter of more than 100 nm and 5 μm, a deprotecting agent (A) for the metal nanoparticles, and an organic solvent (B), in which an aliphatic monocarboxylic acid having 6 to 10 carbon atoms is used as the deprotecting agent (A) for the metal nanoparticles and a polyalkylene glycol is used as the organic solvent (B).

The "average particle diameter" referred here is represented by a volume-average value measured by a dynamic light scattering technique using particles diluted with a good dispersing solvent. For example, the good dispersing solvent used with silver nanoparticles (1 to 50 nm in average particle diameter) protected with an organic compound containing a basic nitrogen atom is water. Nanotrac UPA-150 produced by Microtrac Corporation can be used for the measurement.

The metal nanoparticles having an average particle diameter of 1 to 50 nm protected with the organic compound (X) containing a basic nitrogen atom are constituted by an organic compound (X) containing a basic nitrogen atom and metal nanoparticles (Y) having an average particle diameter of 1 to 50 nm. Surfaces of the metal nanoparticles (Y) are protected by being coated with the organic compound (X) containing a basic nitrogen atom.

In such a state, the metal nanoparticles (Y) are not exposed and the organic compound (X) containing a basic nitrogen atom gives an insulating layer. Thus, a continuous coating film formed by applying the paste at room temperature does not exhibit conductivity. However, in the case that organic compound (X) containing a basic nitrogen atom and coating the metal nanoparticles (Y) reacts with the deprotecting agent (A) described below at a particular temperature, the metal nanoparticles (Y) become exposed and fused to exhibit conductivity.

Any known metal nanoparticles can be used as such metal nanoparticles (Y) protected with the organic compound (X) containing a basic nitrogen atom. Examples of the metal nanoparticles (Y) include metal particles of gold, silver, copper, platinum, etc. Metal nanoparticles having an average particle diameter of 1 to 50 nm are preferred since a finer pattern can be formed, the resistance after baking can be further reduced, and a circuit wiring with good surface smoothness can be formed. Among these, silver nanoparticles are particularly preferred since their metal ions coordinate with a polyethyleneimine which is a most suitable polymer compound containing a basic nitrogen atom described below, and can then be easily reduced in the presence of an adequate reductant at room temperature or under heating.

A low-molecular-weight organic compound, such as a monoalkylamine having a primary amino group such as dodecyl amine or a polyoxyalkylene amine, can be used as the organic compound (X) containing a basic nitrogen atom. However, in order to infallibly protect the metal nanoparticles (Y), a high-molecular-weight organic compound (hereinafter referred to as a polymer compound) is preferably used. A polymer compound having a polyalkyleneimine chain (a) and a hydrophilic segment (b) disclosed in, for example, WO 2008/143061 is the most suitable as such a polymer compound containing a basic nitrogen atom.

Examples of the most suitable polymer compound described above include polymer compounds having polyalkyleneimine chains (a). An imino structure has a basic nitrogen atom and an alkyleneimine unit in the polyalkyleneimine chain (a) can form a coordinate bond with a metal or a metal ion. Thus, such a polymer chain can fix the metal as nanoparticles. The structure thereof is a polymer mainly constituted by an alkyleneimine unit of a secondary amine as a repeating unit and may be linear or branched.

In order to reduce the particle diameter of the polymer compound to improve dispersion stability of the conductive paste, a branched structure is preferred.

The degree of polymerization of the polyalkyleneimine chain (a) is not particularly limited. From the viewpoints of capacity of fixing the metal nanoparticles and preventing an increase in particle diameter during dispersion, the degree of polymerization of the polyalkyleneimine chain (a) is usually in the range of 1 to 10,000, preferably 3 to 3,000, and more preferably 5 to 1,000.

Any synthesizable or commercially available polyalkyleneimine chain may be used as the polyalkyleneimine chain (a). From the viewpoint of industrial availability, a polyethyleneimine chain or a polypropyleneimine chain is preferred.

The hydrophilic segment (b) constituting the polymer compound used in the present invention is a segment that has high compatibility with a solvent when the polymer compound is dispersed in a hydrophilic solvent such as water, and maintains dispersion stability when a dispersion is formed. When dispersed in a hydrophobic solvent, the hydrophilic segment (b) plays a role of forming cores of a dispersion due to strong intra- or intermolecular association force of the hydrophilic segment (b). The degree of polymerization of the hydrophilic segment (b) is not particularly limited but is usually 1 to 10,000 and preferably 3 to 3,000 from the viewpoints of ensuring dispersion stability and preventing aggregation in the case it is dispersed in a hydrophilic solvent and ensuring strong association force and compatibility with a solvent in the case it is dispersed in a hydrophobic solvent. More preferably, the degree of polymerization is 5 to 1,000 from the viewpoint of ease of production. The degree of polymerization is particularly preferably 5 to 500 when it is a polyoxyalkylene chain.

Any hydrophilic segments that are composed of hydrophilic polymer chains generally commercially available or synthesizable can be used as the hydrophilic segment (b) without any limitation. In particular, a hydrophilic segment composed of a nonionic polymer is preferred in a hydrophilic solvent since a highly stable dispersion can be obtained.

Examples of the hydrophilic segment (b) include polyoxyalkylene chains such as polyoxyethylene chains and polyoxypropylene chains; polymer chains composed of polyvinyl alcohols such as polyvinyl alcohol and partially saponified polyvinyl alcohol; polymer chains composed of water-soluble poly(meth)acrylic acid esters such as polyhydroxyethyl acrylate, polyhydroxyethyl methacrylate, dimethylaminoethyl acrylate, and dimethylaminoethyl methacrylate; polyacylalkyleneimine chains having hydrophilic substituents such as polyacetylethyleneimine, polyacetylpropyleneimine, polypropionylethyleneimine, and polypropionylpropyleneimine; and polymer chains composed of polyacrylamides such as polyacrylamide, polyisopropylacrylamide, and polyvinylpyrrolidone. Among these, polyoxyalkylene chains are preferable since a highly stable dispersion can be obtained and industrial availability is high.

The metal nanoparticles protected with the polymer compound containing a basic nitrogen atom may be metal nanoparticles (Y) protected with a polymer compound that contains the polyalkyleneimine chain (a), the hydrophilic segment (b), and a hydrophobic segment (c).

The hydrophobic segment (c) constituting the polymer compound preferred in the present invention has a role of forming a stable dispersion by forming a core of a dispersion by strong intra- or intermolecular association force when the polymer compound is dispersed in a hydrophilic solvent such as water. When dispersed in the hydrophobic solvent, the hydrophobic segment (c) has high affinity with the solvent and maintains the dispersion stability when a dispersion is formed.

The hydrophobic segment (c) may be any segment composed of residues of hydrophobic compounds that are generally commercially available or synthesizable. Examples thereof include residues of polymers such as polystyrenes, e.g., polystyrene, polymethylstyrene, polychloromethylstyrene, and polybromomethylstyrene, water-insoluble poly(meth)acrylic esters, e.g., polymethyl acrylate, polymethyl methacrylate, poly(2-ethylhexyl acrylate), and poly(2-ethylhexyl methacrylate), and polyacylalkyleneimines having hydrophobic substituents, e.g., polybenzoylethyleneimine, polybenzoylpropyleneimine, poly(meth)acryloylethyleneimine, poly(meth)acryloylpropyleneimine, poly[N-{3-(perfluorooctyl)propionyl}ethyleneimine], and poly[N-{3-(perfluorooctyl)propionyl}propyleneimine]; and residues of resins such as epoxy resins, polyurethane, and polycarbonate. The hydrophobic segment (c) may be a residue of a single compound or a residue of a compound obtained by preliminarily reacting two or more different types of compounds.

Among the examples of the hydrophobic segment (c), the residue of an epoxy resin is the most suitable hydrophobic segment when the industrial availability of compounds used as raw materials, ease of handling, the strength of the hydrophobic association force once incorporated in the polymer compound (X), and other factors are considered in total.

The degree of polymerization of the hydrophobic segment (c) is not particularly limited but is normally 1 to 10,000 from the viewpoints of ensuring high dispersion stability and preventing aggregation during dispersing when it is dispersed in a hydrophilic solvent and maintaining high dispersibility and affinity with the solvent when it is dispersed in a hydrophobic solvent. The degree of polymerization is preferably 3 to 3,000 and more preferably 10 to 1,000 when the hydrophobic segment (c) is a polystyrene, a poly(meth)acrylic ester, a polyacylalkyleneimine having a hydrophobic substituent, or the like. When the hydrophobic segment (c) is a residue of a resin such as an epoxy resin, a polyurethane, a polycarbonate, or the like, the degree of polymerization is usually 1 to 50, preferably 1 to 30, and particularly preferably 1 to 20.

The method for producing the most suitable polymer compound used in the present invention is not particularly limited.

A commercially available or synthesized branched polyalkyleneimine chain can be used as described above.

A representative synthetic example of the polymer compound is as follows. (I) A commercially available product is used as a branched polyalkyleneimine and a tosylate of polyethylene glycol monomethyl ether is used as a hydrophilic polymer. The hydrophilic polymer can be obtained by, for example, reacting polyethylene glycol monomethyl ether and tosyl chloride in a polar solvent in the presence of pyridine. When a hydrophobic polymer is used in addition, an epoxy resin terminated with an epoxy group is used as the hydrophobic polymer. When this combination is used, polyethyleneimine is first dissolved in a polar solvent and caused to react with a tosylate of polyethylene glycol monomethyl ether at 100° C. in the presence of a base such as potassium carbonate to synthesize a compound having a polyethylene glycol and a polyethyleneimine structure. Then an epoxy resin is added thereto in an acetone-methanol mixed solvent to conduct reaction at 60° C. As a result, a polymer compound having a polyethylene glycol-polyethyleneimine-epoxy resin structure can be obtained.

Regarding the ratio of the components in the polymer compound, for example, when a polyalkyleneimine chain used is composed of three segments mentioned below, the ratio (a):(b):(c) of the degrees of polymerization of the polymers constituting the chains of the individual components of the polyalkyleneimine chain (a), the hydrophilic segment (b), and the hydrophobic segment (c) is not particularly limited but is usually in the range of 5,000:5 to 5,000,000:1 to 5,000,000 since the resulting metal nanoparticle dispersion has favorable association force, dispersion stability, and storage stability.

The metal nanoparticles (Y) protected with the organic compound (X) having a basic nitrogen atom are preferably prepared such that the content of the organic compound (X) on a nonvolatile matter mass basis is in the range of 1% to 5% relative to the metal nanoparticles (Y). This is because the metal nanoparticle surfaces do not contact moisture or oxygen, the metal nanoparticles do not undergo self-welding, and thus a sufficient protection can be provided, and, moreover, the amount of the deprotecting agent (A) described below can be reduced.

The metal nanoparticles protected with a polymer compound containing a basic nitrogen atom most suitable for the present invention can be easily obtained by adding a metal oxide or a metal ion solution to a medium containing a compound containing a polyalkyleneimine chain and a hydrophilic segment followed by reducing the oxide or ion of the metal and then stabilizing the metal nanoparticles. The metal nanoparticle dispersion produced as such has good dispersion stability and a storage property and potentially has an electric property of the metal nanoparticles.

In the conductive paste, The metal nanoparticles (Y) protected with the organic compound (X) containing a basic nitrogen atom can be produced at any nonvolatile content in a liquid medium containing polyalkylene glycol contained and other organic solvents.

Although the metal nanoparticles (Y) protected with the organic compound (X) having a basic nitrogen atom can be used as a dispersion in the liquid medium described above, it is not preferable to condense the dispersion that contains the metal nanoparticles (Y) protected with the organic compound (X) having a basic nitrogen atom in a low nonvolatile content. Instead, it is preferable to use a nonvolatile matter obtained by removing the liquid medium from the dispersion by spray drying, freeze-drying, or the like. The dispersion preliminarily dispersed in a liquid medium can have a higher nonvolatile content by, for example, condensation, but the stability is impaired and separation or aggregation may occur when a conductive paste is formed. However, the metal nanoparticles (Y) protected with the organic compound (X) having a basic nitrogen atom free of any liquid medium can be used to obtain an excellent conductive paste merely by diluting it to any nonvolatile content without impairing the stability despite a high nonvolatile content.

The metal nanoparticles (Y) can take a densely packed state so as to fill gaps between the metal particles (Z) used in combination. Before baking, the surfaces of the metal nanoparticles (Y) in a densely packed state are protected with the organic compound (X) having a basic nitrogen atom and thus the metal surfaces of the metal nanoparticles (Y) do not make direct contact. However, when baking proceed in such a state, the metal nanoparticles (Y) become exposed due to the action of the deprotecting agent (A) and the metal surfaces thereof make direct contact. Thus, the metal nanoparticles (Y) become sintered to each other even at a relatively low temperature. The metal nanoparticles (Y) in a coating film maintain a densely packed state so as to fill gaps between the metal particles (Z) used in combination and form a dense sintered compact in which the metal particles (Z) are integrated with each other by being connected with the metal nanoparticles (Y). As a result, a better conductivity is achieved. The metal nanoparticles (Y) which are not involved in the integration are baked as they fill fine irregularities on a substrate surface and thus a coating film having high surface smoothness can also be formed.

In the present invention, the metal particles (Z) that have an average particle diameter of more than 100 nm and 5 μm are used in combination with the metal nanoparticles (Y). As discussed above, the metal particles (Z) are stable with a lower surface energy due to larger particle diameter than that of the metal nanoparticles (Y), so that the metal particles (Z) do not need strict protection which is required for the metal nanoparticles (Y). Any conventional dry powder can be used as the metal particles (Z). Examples of the metal particles (Z) include metal particles of gold, silver, copper, platinum, etc. Among that, metal particles having an average particle diameter of 200 to 600 nm are preferred since a concern about clogging of screen mesh is small, fine pitch pattern can be formed, the resistance after baking can be further reduced, and a circuit wiring having high surface smoothness can be formed. In particular, among that, flaky silver particles are preferred.

In the present invention, the ratio of the metal nanoparticles (Y) to the metal particles (Z) used is not particularly limited. The metal nanoparticles (Y)/metal particles (Z) may be 10/90 to 90/10 on a mass basis. In particular, the metal nanoparticles (Y)/metal particles (Z) is preferably 15/85 to 30/70 on a mass basis since a coating film having a lower volume resistivity can be obtained even when the total of the metal nanoparticles (Y) and the metal particles (Z) is decreased.

In preparing a conductive paste suitable for a screen printing method, the total of the metal particles (Z) and the metal nanoparticles (Y) protected with the organic compound (X) having a basic nitrogen atom is preferably 65% or more and more preferably 70% to 95% on a nonvolatile matter mass basis. It is effective to increase the nonvolatile content of the conductive paste in order to improve the screen printability. However, when an additional binder resin is used to achieve this, the nonvolatile content in the conductive paste which is the sum of the metal nanoparticles (Y) protected with the organic compound (X) having a basic nitrogen atom and the metal particles (Z) is decreased and, furthermore, the added binder resin remains in the coating film, and therefore the conductivity decreases. Thus, such use of the additional binder as a third component is preferably limited to a minimum amount that can permit a decrease in conductivity.

The deprotecting agent (A) has a function of exposing the metal nanoparticles (Y) by reacting with the organic compound (X) having a basic nitrogen atom that protects the metal nanoparticles themselves in the metal nanoparticles (Y) protected with the organic compound (X) having a basic nitrogen atom.

During baking of the metal nanoparticles (Y) protected with the organic compound (X) having a basic nitrogen atom at a proper temperature or higher, the organic compound (X) having a basic nitrogen atom reacts with the deprotecting agent (A). Although the reaction products remain in the coating film, the metal nanoparticles (Y) become exposed and fused and form a metal continuous coating film. Thus, a circuit wiring made therefrom exhibits conductivity.

In the present invention, an aliphatic monocarboxylic acid having 6 to 10 carbon atoms is used as the deprotecting agent (A) for the metal nanoparticles. Examples of the aliphatic monocarboxylic acid having 6 to 10 carbon atoms include caproic acid, enanthic acid, caprylic acid, pelargonic acid, and capric acid. These may be used alone or in combination.

In the present invention, since the metal nanoparticles (Y) are used in combination with the metal particles (Z), a coating film that has a lower volume resistivity than when only the metal nanoparticles (Y) are used can be easily obtained. However, in order to maximize this advantageous effect, the deprotecting agent (A) is preferably selected so that the volume resistivity does not increase much even when the deprotecting agent (A) remains in the coating film. From this viewpoint, an aliphatic monocarboxylic acid having 6 to 10 carbon atoms that itself has a lower volume resistivity is selectively used in this invention.

The aliphatic monocarboxylic acid having 6 to 10 carbon atoms does not react with the organic compound (X) having a basic nitrogen atom at room temperature, does not easily evaporate at a heating temperature during baking, and has high miscibility with the organic compound (X) having a basic nitrogen atom, the metal nanoparticles (Y), and the metal particles (Z). Thus, this deprotecting agent (A) has nonconventional features such as that it can form a conductive paste that has high dispersion stability and that does not undergo separation, aggregation, sedimentation, and the like, and that a dry coating film that has a lower volume resistivity is obtained even if the agent remains in the coating film.

In preparing a conductive paste of the present invention, 0.2 to 40 mol of the deprotecting agent (A) is preferably used per mole of the basic nitrogen atom in the organic compound (X) having a basic nitrogen atom on a mass basis. From the viewpoints of achieving a maximum effect of deprotection by the reaction between the basic nitrogen atom and the acid group and preventing the decrease in conductivity caused by the deprotecting agent (A) remaining in the coating film, the deprotecting agent (A) and the organic compound (X) having a basic nitrogen atom are preferably used at a proper ratio. From such a viewpoint, 0.5 to 5 mol of the deprotecting agent (A) is preferably used per mole of the basic nitrogen atom in the organic compound (X) having a basic nitrogen atom on a mass basis.

The organic solvent (B) has a function of preparing a liquid material so that the metal nanoparticles (Y) protected with the organic compound (X) having a basic nitrogen atom and the deprotecting agent (A) can be applied to a substrate composed of any of various materials. The present invention assumes that not only inorganic materials and organic plastic materials such as glass, ceramics, and polyimide that have high heat resistance and high rigidity are used as the substrate material but also that thermoplastics that have low heat resistance or energy-ray-resistance and/or that can be easily formed into thin films and made flexible are used as the substrate material. Thus, an organic solvent that does not cause the substrate material to dissolve or swell, evaporates at a lower temperature, can be fired at a lower temperature, has less odor and lower toxicity, and does not deteriorate the work environment is selected and used.

In the present invention, a polyalkylene glycol is used as such an organic solvent (B). Preferable examples of such polyalkylene glycol include polyalkylene glycols that are liquid at room temperature, such as diethylene glycol, triethylene glycol, tetraethylene glycol, dipropylene glycol, and tripropylene glycol. Among these, a polyalkylene glycol that starts to evaporate at 150° C. or near, such as triethylene glycol, is preferred since it has a low vapor pressure at room temperature, does not evaporate easily, and thus is advantageous in preparing a conductive paste for screen printing. Moreover, this polyalkylene glycol has high miscibility with silver nanoparticles protected with a polymer compound containing a basic nitrogen atom, does not easily undergo separation or the like, does not allow the various thermoplastics to dissolve or swell, can be baked at a lower temperature, has less odor and lower toxicity, and rarely deteriorates the working environment.

The organic solvent (B) is preferably used in an amount of 2 to 9 parts on a mass basis per 100 parts of the nonvolatile matter, which is the total of the metal particles (Z) and the metal nanoparticles (Y) protected with the organic compound (X) having a basic nitrogen atom. Preferably, the amount is 3 to 6 parts to enhance the screen printability.

The conductive paste for screen printing according to the present invention can be prepared by preliminarily mixing the metal nanoparticles (Y) protected with the organic compound (X) having a basic nitrogen atom, the metal particles (Z), the deprotecting agent (A), and the organic solvent (B) as necessary, and stirring and dispersing the resulting mixture under shear force.

As described above, the conductive paste of the present invention is preferably prepared so that a total of the metal nanoparticles (Y) protected with the organic compound (X) having a basic nitrogen atom and the metal particles (Z) is 65% or more and more preferably 70% to 95% on a nonvolatile matter basis, since high screen printability can be achieved.

If needed, the conductive paste for screen printing according to the present invention can contain known additives, such as a defoaming agent, a surfactant, and a rheology controller, in amounts that do not adversely affect the dispersion stability of the paste and performance of the coating film after firing to improve the printing property and the coating property.

The conductive paste for screen printing according to the present invention obtained as such is, for example, applied to a thermoplastic substrate, such as PET, PEN, or polycarbonate, that has a lower heat resistance and lower energy ray resistance and/or that can easily form a thin film or made flexible so that the applied paste corresponds to the circuit wiring and then baked at 150° C. or less to draw a circuit wiring pattern.

Glass, ceramics, polyimide, and the like have high rigidity, require much work to form a thin-film substrate and to make them flexible, and are expensive. In contrast, thermoplastics described above can be easily shaped, made into a thin film, and made flexible, and are inexpensive. Thus thermoplastics are suitable for weight- and size-reduction of the substrate. Accordingly, when the conductive paste for screen printing according to the present invention that can be baked at 150° C. or less (a temperature lower than conventionally required), without irradiation of an energy ray, that exhibits higher surface smoothness than conventional, and that can draw a fine pattern is used for forming a circuit wiring on a thermoplastic that has low heat resistance or low energy-ray-resistance and/or that can be easily formed into thin films and made flexible, a light-weight or miniaturized electric and electronic parts can be provided.

EXAMPLES

The present invention will now be described in further detail using Examples and Comparative Examples below. In Examples and Comparative Examples below, "parts" and "%" are on a mass basis.

Production Example 1

In a nitrogen atmosphere, a chloroform (30 ml) solution containing 9.6 g (50.0 mmol) of p-toluenesulfochloride was added dropwise to a mixed solution containing 20.0 g (10.0 mmol) of methoxy polyethylene glycol [Mn=2,000], 8.0 g (100.0 mmol) of pyridine, and 20 ml of chloroform for 30 minutes under ice cooling and stirring. Upon completion of the dropwise addition, stirring was continued for 4 hours at a bath temperature of 40° C. Upon completion of the reaction, 50 ml of chloroform was added to dilute the reaction solution. The resulting product was washed with 100 ml of a 5% aqueous hydrochloric acid solution, 100 ml of a saturated aqueous sodium hydrogen carbonate solution, and then 100 ml of a saturated saline solution, dried over magnesium sulfate, filtered, and condensed at a reduced pressure. The resulting solid was washed with hexane several times, filtered, and dried at a reduced pressure at 80° C. to obtain 22.0 g of a tosylated product. In a nitrogen atmosphere, 5.39 g (2.5 mmol) of this compound, 20.0 g (0.8 mmol) of a branched polyethyleneimine (produced by Aldrich, molecular weight; 25,000), 0.07 g of potassium carbonate, and 100 ml of N,N-dimethylacetamide were stirred for 6 hours at 100° C. To the resulting reaction mixture, 300 ml of an ethyl acetate/hexane mixed solution (V/V=1/2) was added, followed by vigorous stirring at room temperature, and the product solid was filtered. The solid was washed twice with 100 ml of an ethyl acetate/hexane mixed solution (V/V=1/2) and dried at a reduced pressure to obtain 24.4 g of a solid, polymer 1 in which a polyoxyethylene chain was bonded to a branched polyethyleneimine and which was used as a polymer compound (X) having a polyalkyleneimine chain (a) and a hydrophilic segment (b).

To 5.0 g of silver oxide, 58.8 g of an aqueous solution of 0.296 g of the polymer 1 was added, followed by stirring for 30 minutes at 25° C. Then 33.6 g of ethylenediamine was slowly added under stirring. The reaction solution turned blackish brown and slightly generated heat but left as was and stirred at 25° C. for 30 minutes. Then 7.6 g of a 10% aqueous ascorbic acid solution was slowly added thereto under stirring. The stirring was further continued for 20 hours while keeping that temperature. As a result, a dispersion containing blackish brown silver-containing nanostructures was obtained. The dispersion was rapidly frozen at about −30° C., the solvent was dried by sublimation in a vacuum state by further reducing the pressure, and a freeze-dried product of silver nanoparticles protected with the polymer 1 in which polyoxyethylene chains are bonded to branched polyethyleneimine was obtained (nonvolatile content: 92%). This product contained silver nanoparticles having an average particle diameter in the range of 1 to 50 nm when measured by using water as a good dispersing solvent.

Example 1

Into a mortar, 85 g of the freeze-dry product of silver nanoparticles protected with the polymer 1 in which polyoxyethylene chains are bonded to branched polyalkylimine chains obtained in Production Example 1, 300 g of silver nanoflake N300 (dry powder of flaky silver particles having an average particle diameter of 430 nm) produced by Tokusen Co., Ltd., 15 g of triethylene glycol (hereinafter referred to as TEG), and 32 g of caprylic acid were placed and pre-mixed with each other. The resulting mixture was dispersed and mixed with a hoover automatic muller to prepare a conductive silver paste.

The silver paste was applied to a glass substrate by screen-printing using a 400 mesh screen into a strip-shape pattern 1 cm×3 cm in size and fired in an oven at 150° C. for 30 minutes.

Whether the coating film on the substrate after baking formed a continuous film or not was confirmed using a scanning electron microscopes (SEM) at a magnification of 30,000 to evaluate the screen printability. The conductivity of the coating film on the substrate after baking was evaluated by measuring the resistance by a four-probe method.

Comparative Example 1

A silver paste was prepared as in Example 1 except that water was used instead of triethylene glycol. The silver paste was applied by screen-printing as in Example 1. As a result, blurring occurred in the printed coating and thus it was shown that the paste has no screen printability.

Comparative Example 2

A silver paste was prepared as in Example 1 except that caprylic acid was not added. The silver paste was applied by screen-printing as in Example 1 and baked as in Example 1. Whether the print formed a continuous film was confirmed with an electron microscope in the same manner and it was confirmed that the silver paste was capable of drawing patterns by screen printing.

Comparative Example 3

A silver paste was prepared as in Example 1 except that 22 g of succinic anhydride was used instead of 32 g of caprylic acid. The silver paste was applied by screen-printing as in Example 1 and baked as in Example 1. Whether the print formed a continuous film was confirmed with an electron microscope in the same manner and it was confirmed that the silver paste was capable of drawing patterns by screen printing.

The evaluation results of Example 1 and Comparative Examples 1 to 3 are shown in Table 1.

TABLE 1

|  | Example 1 | Comparative Example 1 | Comparative Example 2 | Comparative Example 3 |
|---|---|---|---|---|
| Solvent | TEG | Water | TEG | TEG |
| Blend ratio *1) |  | 0.25 |  |  |
| Deprotecting agent | Caprylic acid | Caprylic acid | None | Succinic anhydride |
| Screen printability | Yes | No | Yes | Yes |
| Volume resistivity of coating film after baking at 150° C. (Ω cm) | $9 \times 10^{-6}$ | $810 \times 10^{-6}$ | $49 \times 10^{-6}$ | $19 \times 10^{-6}$ |

Note
*1) Mass ratio of the nonvolatile matter in silver nanoparticles protected with a polymer compound having a polyalkylimine chain and a hydrophilic segment/the nonvolatile matter in the silver particles.

Comparison between Example 1 and Comparative Examples 1 to 3 clearly shows that the conductive paste of the present invention has screen printability, can be baked at a lower temperature, and gives an excellent conductive circuit wiring pattern, which has one-digit lower resistance of the coating film obtained by baking.

The experimental results that used glass substrates were shown in the examples above; however, it was confirmed that the same circuit wiring pattern could be drawn on a commercially available PEN film without sagging of the film.

The conductive paste of Example does not cause commodity plastics to dissolve or swell (low activity), generates less odor and has lower toxicity, does not deteriorate the working environment, and can be applied by a screen printing technique. Moreover, the organic solvent evaporates at a temperature lower than conventionally required and a circuit wiring that shows a lower resistance could be formed even by firing at a temperature lower than conventionally required.

INDUSTRIAL APPLICABILITY

Since the conductive paste of the present invention uses metal nanoparticles and metal particles as a metal component and is prepared by combining a particular deprotecting agent and a particular organic solvent, the paste can be applied by screen printing with a fine-pitched screen that can form a fine circuit and a circuit wiring having a lower resistance can be formed on a commodity plastic substrate having low heat resistance, by low-temperature baking.

The invention claimed is:

1. A method to produce a circuit pattern by using a conductive paste for screen printing, comprising;
   providing the conductive paste, wherein the conductive paste comprises:
      metal nanoparticles (Y) having an average particle diameter of 1 to 50 nm and having a surface coated with a polymer compound having a branched polyalkyleneimine chain and a polymer chain selected from the group consisting of a polyoxyalkylene chain, a polymer chain composed of a polyvinyl alcohol, a polymer chain composed of a water-soluble poly (meth)acrylic acid, a polyacylalkyleneimine chain having a hydrophilic substituent, and a polymer chain composed of a polyacrylamide;
      metal particles (Z) having an average particle diameter of 200 to 600 nm;
      an aliphatic monocarboxylic acid having 6 to 10 carbon atoms; and
      an organic solvent (B),
      wherein a polyalkylene glycol is used as the organic solvent (B),
   printing the conductive paste on a substrate, and baking the conductive paste at a temperature of 150° C. or lower to form a circuit pattern having a resistivity on the order of $10^{-6}$ Ωcm.

2. The method according to claim 1, wherein the aliphatic monocarboxylic acid having 6 to 10 carbon atoms is caprylic acid.

3. The method according to claim 1, wherein the polyalkylene glycol is triethylene glycol.

4. The method according to claim 1, wherein a total nonvolatile content of the metal nanoparticles (Y) and the metal particles (Z) is 70% to 95% on a mass basis.

5. The method according to claim 1, wherein the circuit pattern is included in an electric or electronic component.

6. The method according to claim 2, wherein the circuit pattern is included in an electric or electronic component.

7. The method according to claim 3, wherein the circuit pattern is included in an electric or electronic component.

8. The method according to claim 4, wherein the circuit pattern is included in an electric or electronic component.

9. The method according to claim 1, wherein the polyacylalkyleneimine chain having hydrophilic substituents is one selected from the group consisting of polyacetylethyleneimine, polyacetylpropyleneimine, polypropionylethyleneimine, and polypropionylpropyleneimine.

10. The method according to claim 1, wherein the substrate is a flexible substrate made of polyethylene terephthalate, polyethylene naphthalate or polycarbonate.

* * * * *